Oct. 28, 1941.    M. BARNETT    2,260,654
SPOON
Filed Dec. 11, 1939
FIG-1
FIG-2
FIG-3
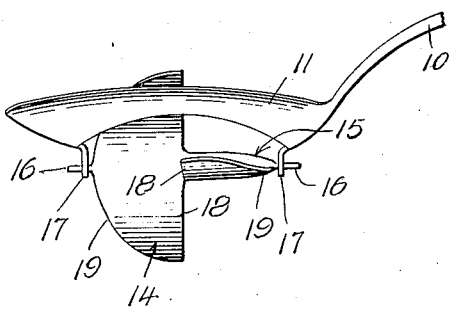
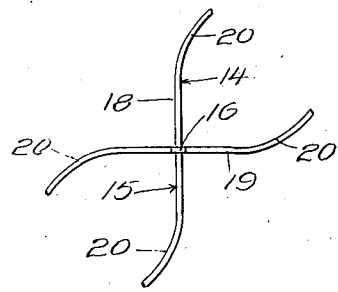
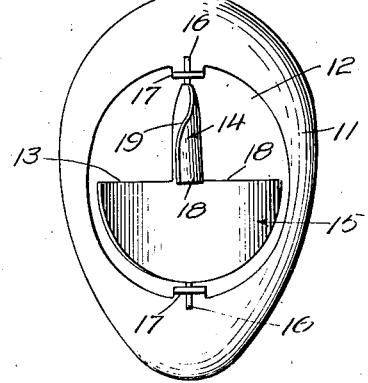
Mark Barnett
INVENTOR
BY *Victor J. Evans & Co.*
ATTORNEYS Patented Oct. 28, 1941

2,260,654

UNITED STATES PATENT OFFICE 2,260,654

SPOON

Mark Barnett, Whiting, Ind.

Application December 11, 1939, Serial No. 308,705

2 Claims. (Cl. 259—144)

This invention relates to spoons and has for an object to provide a spoon having the bowl constituting a frame for blades which will rotate when the spoon is used for mixing eggs, candy, dough or any other material, and will more thoroughly mix the material than similar devices heretofore purposed.

A further object is to provide a device of this character which will be formed of a few strong simple and durable parts which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a plan view of the spoon constructed in accordance with the invention.

Figure 2 is a fragmentary side elevation of the spoon shown in Figure 1.

Figure 3 is an edge elevation of the blades of the spoon.

Referring now to the drawing in which like characters of reference designate similar parts in the various views, 10 designates the handle and 11 the bowl of a spoon, the bowl being cut away centrally, as shown at 12, to provide a frame for the mixing blades.

The blades are formed from a single blank of material of substantially circular contour, cut transversely along a diameter, as shown at 13, to near the center of the blank and the material on one side of the cut being deformed to provide two blades 14 and 15 arranged in right angular relation.

The blades are provided with gudgeons 16 which are journaled in depending eyes 17 on the frame 11. Each blade is extended above and below the frame 11 when in one position of its rotary movement, as best shown in Figure 2. Each blade is substantially the shape of one-half a disc in contour, the straight inner edges 18 of the blades being located at the transverse center of the frame 11, as best shown in Figure 1, and the rounded outer edges 19 of the blades being disposed adjacent the wall of the opening 12 of the frame 11.

When the spoon is in use, the blades rotate in unison within the frame 11 about an axis extending longitudinally of the spoon to thoroughly mix the material being stirred. To promote rotation of the blades, each blade is curved in opposite directions on opposite sides of the longitudinal axis of the spoon as best shown at 20 in Figure 3.

From the above description it is thought that the construction and operation of the invention will be fully understood without further explanation.

What is claimed is:

1. A spoon comprising a handle, a bowl cut away to provide a central opening, a pair of integrally connected blades in said opening journaled for rotation about an axis extending longitudinally of the bowl, each blade extending in its entirety above and below the bowl when in one position of its rotary movement, each blade being substantially the shape of one-half of a disk in contour, the inner edges of the blades being located at the transverse center of the opening, the outer edges of the blades being disposed adjacent the wall of the opening, each blade being curved in opposite directions on opposite sides of the longitudinal axis of the spoon.

2. The structure of claim 1 in which the rotatable mounting of the blades is accomplished through the medium of gudgeons on the outer edges of the blades disposed in alinement and coincident with the longitudinal axis of the bowl, and eyes struck from the bowl and disposed below the bowl rotatably receiving the gudgeons.

MARK BARNETT.